US009007618B2

(12) United States Patent
Harada

(10) Patent No.: US 9,007,618 B2
(45) Date of Patent: Apr. 14, 2015

(54) IMAGE PROCESSING DEVICE, IMAGE PROCESSING SYSTEM, AND USER AUTHENTICATION METHOD MORE SPECIFICALLY RELATES TO A TECHNIQUE OF REDUCING POWER CONSUMED BY A HUMAN BODY COMMUNICATION TERMINAL HELD BY A USER

(71) Applicant: Konica Minolta, Inc., Chiyoda-ku (JP)

(72) Inventor: Kazuki Harada, Amagasaki (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/081,505

(22) Filed: Nov. 15, 2013

(65) Prior Publication Data

US 2014/0139863 A1 May 22, 2014

(30) Foreign Application Priority Data

Nov. 20, 2012 (JP) .................................. 2012-254044

(51) Int. Cl.
*G06F 3/12* (2006.01)
*G06K 15/00* (2006.01)
(Continued)

(52) U.S. Cl.
CPC ....... *H04N 1/00315* (2013.01); *H04N 1/00339* (2013.01); *H04N 1/00342* (2013.01); *H04N 1/4426* (2013.01); *H04N 2201/0094* (2013.01)

(58) Field of Classification Search
USPC ........ 358/1.14, 1.13, 1.15, 1.16; 700/1, 2, 12, 700/19, 27, 65, 70, 82, 89, 124, 260, 291, 700/301, 302, 305, 306; 340/10.1, 10.51, 340/10.4, 10.52, 12.5, 12.52, 13.21, 13.24, 340/13.25, 13.26, 13.31, 13.36
See application file for complete search history.

(56) References Cited

U.S. PATENT DOCUMENTS

2007/0234400 A1 10/2007 Yanagi
2010/0031346 A1 2/2010 Kano
(Continued)

FOREIGN PATENT DOCUMENTS

JP 11-161602 A 6/1999
JP 2003-117152 A 4/2003
(Continued)

OTHER PUBLICATIONS

Maki, Monitoring System Security System and Intruder Detection Method, Apr. 8, 2011, Machine Translated Japanese Patent Publication, JP2011150528, All Pages.*

(Continued)

*Primary Examiner* — Ngon Nguyen
(74) *Attorney, Agent, or Firm* — Buchanan Ingersoll & Rooney PC

(57) ABSTRACT

An image processing device that executes a job based on instruction operation by a user authenticated as a result of user authentication, comprises a human body communication controller that makes human body communication with a human body communication terminal held by a user through at least one human body communication antenna arranged around a device body, and an authenticating unit that performs user authentication based on user information the human body communication controller acquires from said human body communication terminal. The human body communication controller makes the human body communication terminal shift from a communication mode to a power-saving mode in response to authenticating a user by the authenticating unit.

19 Claims, 11 Drawing Sheets

(51) Int. Cl.
*G06F 15/00* (2006.01)
*H04N 1/00* (2006.01)
*H04N 1/44* (2006.01)

(56) References Cited

U.S. PATENT DOCUMENTS

2010/0137063 A1* 6/2010 Shirakawa et al. ............. 463/31
2012/0026129 A1   2/2012 Kawakami
2012/0327447 A1* 12/2012 Funakawa .................... 358/1.13

FOREIGN PATENT DOCUMENTS

| JP | 2007-257038 A | 10/2007 |
| JP | 2008-216338 A | 9/2008 |
| JP | 2009-224877 A | 10/2009 |
| JP | 2010-033325 A | 2/2010 |
| JP | 2010-059648 A | 3/2010 |
| JP | 2010-182203 A | 8/2010 |
| JP | 2011-150528 A | 8/2011 |
| JP | 2011-182279 A | 9/2011 |
| JP | 2012-034157 A | 2/2012 |
| JP | 2012-124592 A | 6/2012 |
| JP | 2012-141948 A | 7/2012 |
| JP | 2012-194720 A | 10/2012 |

OTHER PUBLICATIONS

Office Action issued on Dec. 9, 2014, by the Japan Patent Office in corresponding Japanese Patent Application No. 2012-254044, and an English Translation of the Office Action. (11 pages)

* cited by examiner

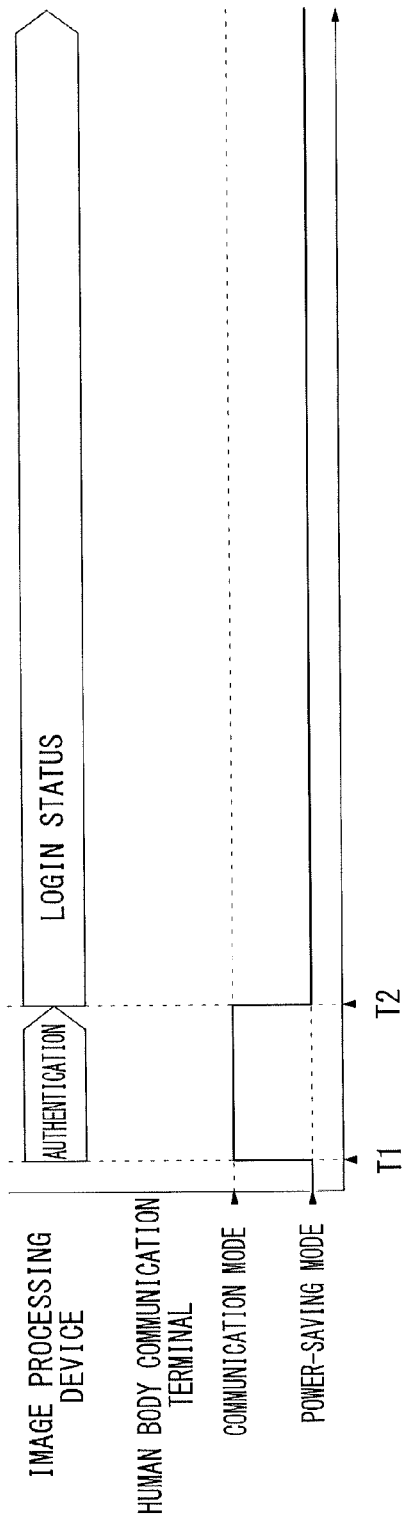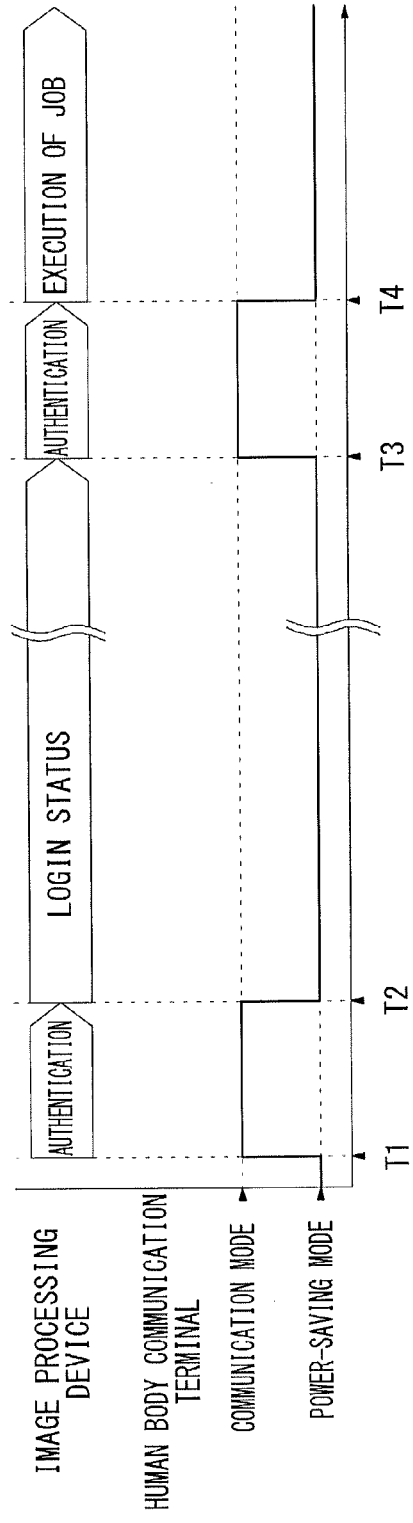

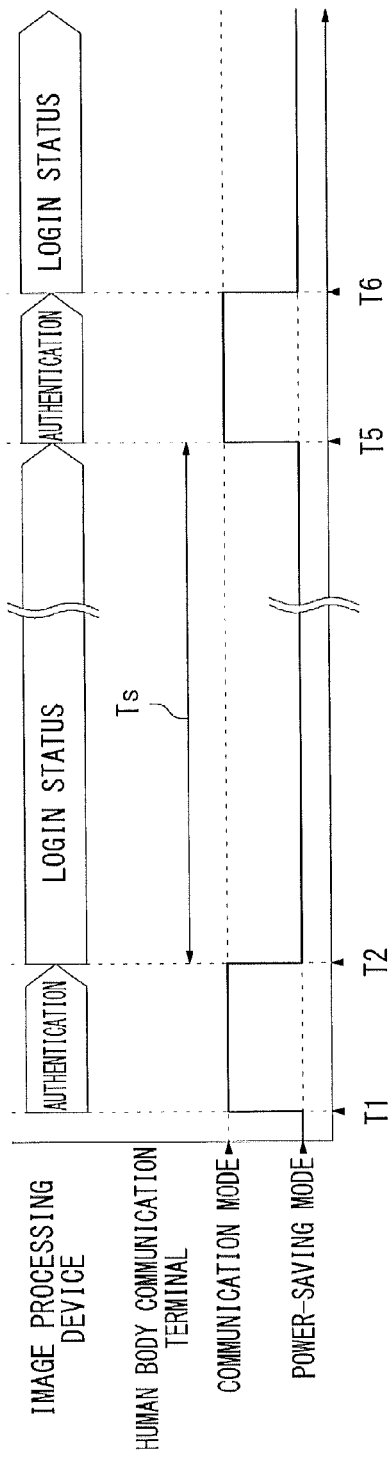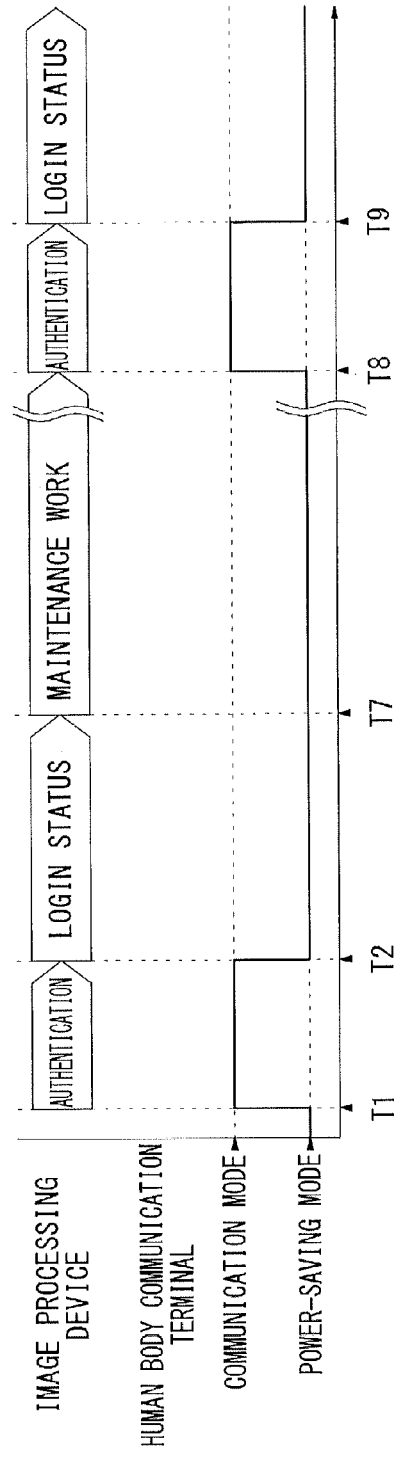

IMAGE PROCESSING DEVICE, IMAGE
PROCESSING SYSTEM, AND USER
AUTHENTICATION METHOD MORE
SPECIFICALLY RELATES TO A TECHNIQUE
OF REDUCING POWER CONSUMED BY A
HUMAN BODY COMMUNICATION
TERMINAL HELD BY A USER

This application is based on the application No. 2012-254044 filed in Japan, the contents of which are hereby incorporated by reference.

BACKGROUND OF THE INVENTION

1. Field of the Invention

The present invention relates to an image processing device, an image processing system, and a user authentication method. The present invention more specifically relates to a technique of reducing power consumed by a human body communication terminal during user authentication performed via human body communication with a human body communication terminal held by a user.

2. Description of the Background Art

According to a technique conventionally known, a human body communication unit and a human body device make communication through the body of a person carrying the human body device, and user authentication is performed based on information the human body communication unit receives from the human body device (as described in Japanese Patent Application Laid-Open No. 2010-182203, for example). Such a technique of performing user authentication via human body communication tends to be employed in various fields in recent years, and is used for automatically unlocking a locked door of an office, for example. As an example, a mat-like antenna for human body communication with a human body communication terminal (human body device) is placed in front of a locked door of a security room, and an authentication device to automatically unlock the door is connected to the antenna. According to this authentication system, when a user stands in front of the door for entry into the security room, the human body communication terminal carried by the user and the authentication device start to make human body communication through the mat-like antenna. The authentication device performs user authentication based on information received from the human body communication terminal. If the authentication is completed successfully, the door is unlocked to allow entry into the security room.

The aforementioned authentication system makes human body communication for example as follows: the human body communication terminal applies an electric field to part of the body of a user, and the mat-like antenna detects resultant field change appearing on a surface of the body of the user. However, if the human body communication terminal keeps applying an electric field all the time to the body of the user, a battery built in the human body communication terminal drains rapidly. Hence, the aforementioned authentication system is configured such that a certain electric field is generated in the mat-like antenna, and when a user stands on the mat-like antenna, the human body communication terminal detects resultant field change to shift from a power-saving mode to a communication mode. Specifically, the human body communication terminal does not apply an electric field to the body of a user in the power-saving mode to reduce the consumption of the battery, and starts applying an electric field to the body after shifting to the communication mode. When the human body communication terminal stops detecting field change transmitted from the mat-like antenna, it shifts from the communication mode to the power-saving mode again to reduce the consumption of the battery. As a result, the human body communication terminal is in the communication mode only in a limited period such as several seconds when a user stands in front of the door of the security room, and returns to the power-saving mode after the user enters the security room. The human body communication terminal then keeps the power-saving mode, thereby allowing suppression of drain of the battery.

In terms of security, for example, an image processing device such as an MFP (multifunction peripheral) placed for example in an office authenticates a user using the image processing device, according to the situation. Thus, the user authentication technique via human body communication is also applicable for authentication of a user to use an image processing device. Specifically, the following situation may be assumed: a mat-like antenna for human body communication with a human body communication terminal is placed in front of the image processing device, and user authentication is performed by acquiring user information from the human body communication terminal carried by a user who is standing on the antenna with the intention of using the image processing device.

When using the image processing device, a user generally performs detailed setting operation relating to a job including setting for print output and setting for reading of a document, and then performs operation to instruct execution of the job. After performing the setting operation for the job and the operation to instruct execution of the job, the user may keep waiting until execution of the job is completed in the image processing device. This prolongs time when the user stands on the mat-like antenna placed in front of the image processing device, so that the human body communication terminal carried by the user keeps the communication mode for a long time. Hence, employing user authentication via human body communication as user authentication in the image processing device leads to a problem of shortened battery lifetime of the human body communication terminal.

SUMMARY OF THE INVENTION

First, the present invention is intended for an image processing device that executes a job based on instruction operation by a user authenticated as a result of user authentication. According to one aspect of this invention, the image processing device includes a human body communication controller that makes human body communication with a human body communication terminal held by a user through at least one human body communication antenna arranged around a device body, and an authenticating unit that performs user authentication based on user information the human body communication controller acquires from the human body communication terminal. The human body communication controller makes the human body communication terminal shift from a communication mode to a power-saving mode in response to authenticating a user by the authenticating unit.

Second, the present invention is intended for an image processing system including: an image processing device that executes a job based on instruction operation by a user authenticated as a result of user authentication; a human body communication terminal which can be carried by a user and which stores user information about this user; and a human body communication antenna arranged around the image processing device, the human body communication antenna making data communication with the human body communication terminal held by a user through the body of this user. According to one aspect of this invention, the human body communication terminal is configured to detect an electric field applied to the body of a user by the human body communication antenna to shift from a power-saving mode to a communication mode, and then transmit the user information through the body of the user. The image processing device acquires the user information transmitted from the human body communication terminal through the human body communication antenna and performs user authentication. In response to authenticating a user as a result of the user authentication, the image processing device makes the human body communication terminal shift from the communication mode to the power-saving mode through the human body communication antenna.

Third, the present invention is intended for a user authentication method that performs user authentication by making human body communication with a human body communication terminal held by a user. According to one aspect of this invention, the user authentication method includes the steps of: (a) making the human body communication terminal shift from a power-saving mode to a communication mode at a time when a user contacts at least one human body communication antenna and making human body communication with the human body communication terminal, thereby acquiring user information transmitted from the human body communication terminal; (b) performing user authentication based on the user information; and (c) in response to authenticating a user as a result of the user authentication, making the human body communication terminal shift from the communication mode to the power-saving mode.

The present invention is configured to perform user authentication via human body communication, and allows suppression of the consumption of a battery of the human body communication terminal held by a user, thereby solving the conventional problems.

BRIEF DESCRIPTION OF THE DRAWINGS

FIGS. 6A, 6B, 7A and 7B are timing charts each showing transitions of respective acting statuses of the image processing device and the human body communication terminal;

DESCRIPTION OF THE PREFERRED EMBODIMENTS

Preferred embodiments of the present invention will be described in detail below. Components common to the preferred embodiments are identified by the same reference numbers, and will not be discussed repeatedly for the same description.

First Preferred Embodiment

Figure 1:
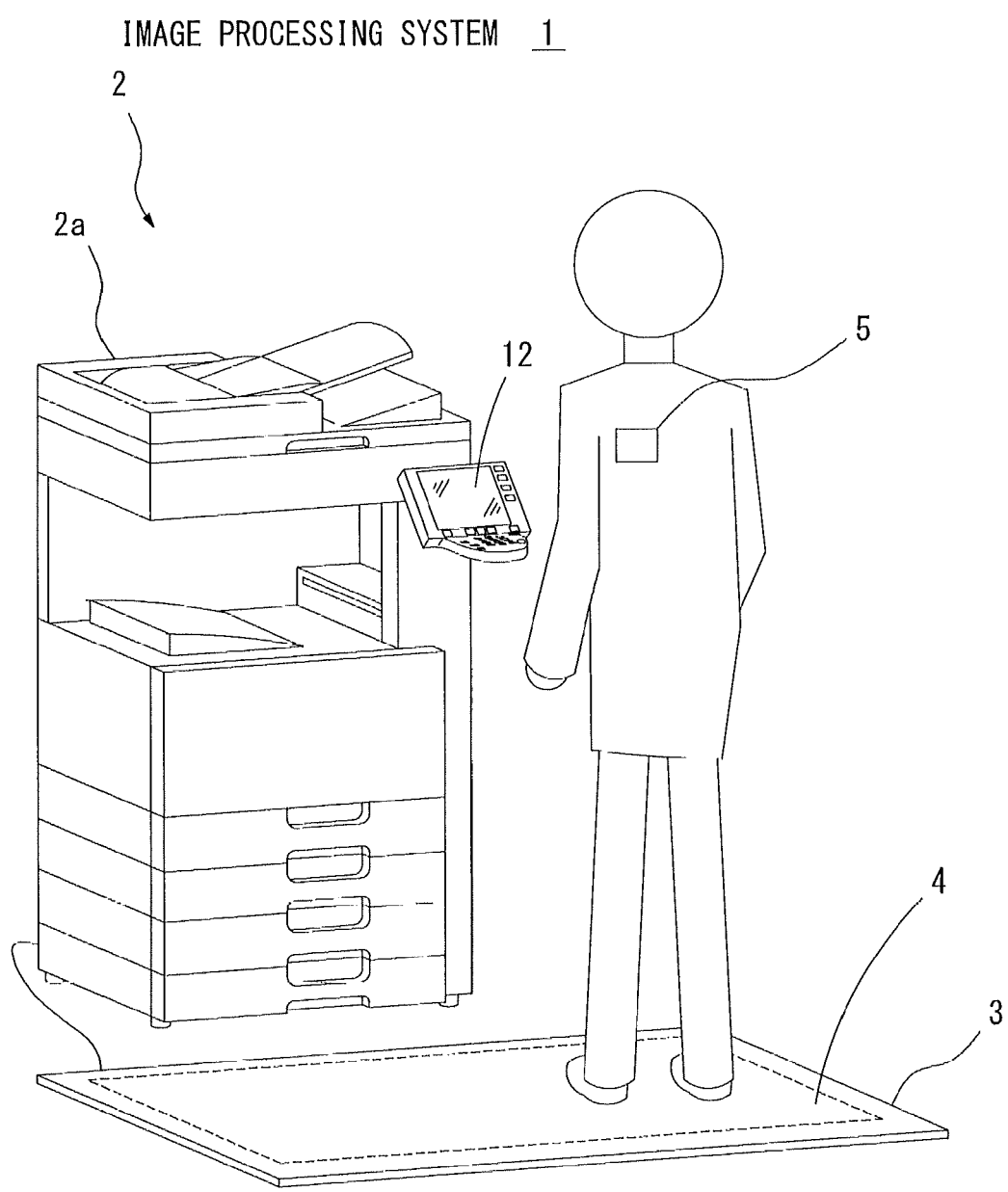
FIG. 1 shows an example of the structure in external appearance of an image processing system of a first preferred embodiment.

FIG. 1 shows an example of the structure in external appearance of an image processing system 1 of a first preferred embodiment of the present invention. The image processing system 1 includes an image processing device 2 that executes a job based on instruction operation by a user, a human body communication antenna 4 built in a mat 3 placed on the front side of a device body 2a of the image processing device 2, and a human body communication terminal 5 which can be carried by a user to use the image processing device 2 and which stores user information such as an ID about the user.

The image processing device 2 is composed of an MFP (multifunction peripheral). The image processing device 2 executes various jobs such as a print job, a scan job, and a data transmission job based on instruction operation by a user authenticated as a result of user authentication. The image processing device 2 is connected to the human body communication antenna 4 arranged on the front side of the device body 2a, and makes human body communication through the human body communication antenna 4 with the human body communication terminal 5 held by the user. The image processing device 2 performs user authentication based on user information acquired as a result of the human body communication from the human body communication terminal 5.

Figure 2:
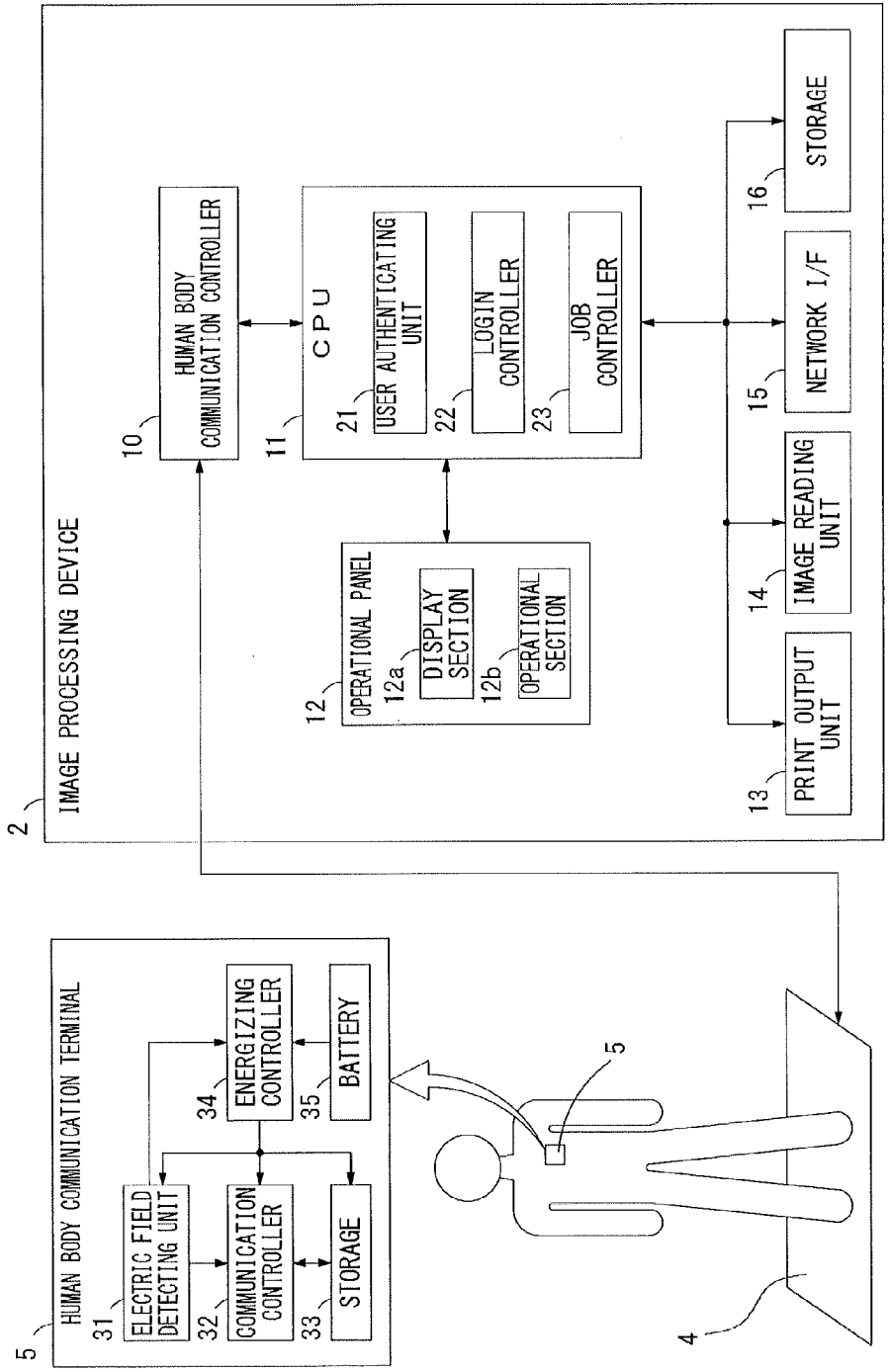
FIG. 2 is a block diagram showing a functional structure of the image processing system.

FIG. 2 is a block diagram showing a functional structure of the image processing system 1. As shown in FIG. 2, the image processing device 2 includes a human body communication controller 10, a CPU 11, an operational panel 12, a print output unit 13, an image reading unit 14, a network interface 15, and a storage 16.

The human body communication controller 10 controls the human body communication antenna 4 to make human body communication with the human body communication terminal 5 held by a user. The human body communication controller 10 is configured to generate an electric field at a certain level in advance in the human body communication antenna 4, acquire information the human body communication antenna 4 receives through the body of a user, and output the information to the CPU 11. Further, when acquiring information to be transmitted from the CPU 11 to the human body communication terminal 5, the human body communication controller 10 changes an electric field in the human body communication antenna 4 based on this information to generate field change on a surface of the body, thereby transmitting resultant information to the human body communication terminal 5.

The CPU 11 is an arithmetic processing unit that executes various programs installed in advance on the image processing device 2. The CPU 11 executes these programs, thereby functioning as a user authenticating unit 21, a login controller 22, and a job controller 23.

When the human body communication controller 10 receives user information transmitted from the human body communication terminal 5, the user authenticating unit 21 performs user authentication based on the received user information to determine if a user holding the human body communication terminal 5 is a normal user. The user authenticating unit 21 performs user authentication for example by comparing information about a registered user stored in advance in the storage 16 and user information the human body communication controller 10 receives. However, this is not the only way of user authentication, but the user authenticating unit 21 may perform user authentication by transmitting a request for authentication to an external authentication server through the network interface 15.

The login controller 22 makes the image processing device 2 shift from a logout status to a login status or from a login status to a logout status based on a result of user authentication by the user authenticating unit 21. If the user authentication by the user authenticating unit 21 is completed successfully and a user holding the human body communication terminal 5 is determined as a normal user, the login controller 22 determines this user as a login user and makes the image processing device 2 shift to a login status with the login user. In contrast, if the user authentication ends in failure, the login controller 22 keeps the image processing device 2 in a logout status without making the image processing device 2 shift a login status.

After the image processing device 2 shifts to a login status, the job controller 23 makes each part reflect corresponding detailed setting relating to a job such as setting for print output or setting for reading a document based on instruction operation by a login user, and controls execution of a job based on operation by the login user to instruct execution of the job.

The operational panel 12 functions as a user interface when a user uses the image processing device 2. The operational panel 12 includes a display section 12a on which various types of information are presented to a user, and an operational section 12b that accepts instruction operation by the user. The operational panel 12 displays an operational screen corresponding to a login user on the display section 12a based on instruction from the CPU 11, and outputs to the CPU 11 an operational signal responsive to operation performed on the operational section 12b by the login user. Thus, when the image processing device 2 shifts to a login status, the login user becomes capable of performing setting operation for a job or operation to instruct execution of the job on the operational panel 12. As shown in FIG. 1, the operational panel 12 is arranged on the front side of the device body 2a of the image processing device 2. Thus, the mat 3 with the human body communication antenna 4 is placed in a position where a user to perform operation on the operational panel 12 stands, specifically, is placed on the front side of the device body 2a.

The print output unit 13 makes print output by executing a print job according to print setting made based on instruction from the job controller 23. The image reading unit 14 reads a document page by page to generate image data by executing a scan job according to setting for reading of the document made based on instruction from the job controller 23. The network interface 15 establishes connection of the image processing device 2 to a network such as a LAN. The storage 16 is a nonvolatile storage such as a hard disk drive, and stores not only the various programs to be executed by the CPU 11 but also stores various types of data. As an example, the storage 16 can store print data received through a network, image data generated by reading a document by the image reading unit 14, facsimile data received through a public phone network not shown in the drawings, and the like.

The human body communication terminal 5 carried by a user includes an electric field detecting unit 31, a communication controller 32, a storage 33, an energizing controller 34, and a battery 35.

The electric field detecting unit 31 detects an electric field appearing on a surface of the body of a user, and detects change of an electric field generated in the body. When a user moves to the front of the image processing device 2 and stands on the human body communication antenna 4, an electric field generated in the human body communication antenna 4 is transmitted through the body of the user and then detected by the electric field detecting unit 31. When the image processing device 2 transmits information to the human body communication terminal 5 through the human body communication antenna 4, the human body communication antenna 4 changes an electric field at a predetermined bit rate in response to the information. As a result, the electric field detecting unit 31 detects the resultant field change through the body of the user, thereby receiving the information transmitted from the image processing device 2.

The communication controller 32 starts to operate when the human body communication terminal 5 shifts to a communication mode. Then, the communication controller 32 reads information stored in advance in the storage 33, and transmits this information through the body of a user. As an example, the communication controller 32 changes an electric field to be applied to part of the body of a user at a predetermined bit rate in response to information to be transmitted and generates field change on a surface of the body of the user, thereby transmitting the information. Further, when the electric field detecting unit 31 receives information by detecting field change in the body of a user, the communication controller 32 analyzes this information, and specifies a received command. The communication controller 32 is also configured to perform process in response to the received command.

The storage 33 is a nonvolatile storage composed for example of a memory. Identification information such as ID used to identify a user is stored in advance as user information in the storage 33. When the human body communication terminal 5 shifts to the communication mode, this user information is read automatically by the communication controller 32, and is transmitted to the image processing device 2 through the body of a user. The storage 33 can store information other than the user information, The energizing controller 34 controls an energizing condition made by the battery 35. Specifically, the energizing controller 34 switches the energizing condition of the human body communication terminal 5 between a power-saving mode and the communication mode.

The power-saving mode is an acting mode where power supplied from the battery 35 is output to the electric field detecting unit 31 to make the electric field detecting unit 31 perform an electric field detecting function effectively. The power-saving mode is also an acting mode where power supply to the communication controller 32 is stopped to stop data communication function, thereby reducing power consumption. If the storage 33 is such a device that keeps storing information by receiving power supplied from the battery 35, power supply to the storage 33 continues even in the power-saving mode. In contrast, the communication mode is an another acting mode where power supplied from the battery 35 is output to both the electric field detecting unit 31 and the communication controller 32, thereby making the electric field detecting unit 31 perform the electric field detecting function effectively while making the communication controller 32 perform the data communication function effectively. In the communication mode, the communication controller 32 should generate electric charge required to generate an induced electric field on a surface of the body of a user. Thus, the communication mode increases the power consumption of the battery 35 compared to the power-saving mode.

If the electric field detecting unit 31 does not detect an electric field at a certain level or higher from the body of a user, the energizing controller 34 keeps the energized status of the human body communication terminal 5 in the power-saving mode. If the electric field detecting unit 31 detects an electric field at the certain level or higher from a surface of the body of the user while the human body communication terminal 5 is in the power-saving mode, the energizing controller 34 changes the energized status of the human body communication terminal 5 from the power-saving mode to the communication mode. In response, the communication controller 32 stars to operate to repeatedly perform act of reading user information from the storage 33 and transmitting the read user information. When the electric field detecting unit 31 stops detecting an electric field at the certain level or higher while the human body communication terminal 5 is in the communication mode, the energizing controller 34 changes the energized status of the human body communication terminal 5 from the communication mode to the power-saving mode after elapse of a predetermined period of time. If the electric field detecting unit 31 receives a power-saving command from the image processing device 2, the energizing controller 34 changes the energized status of the human body communication terminal 5 from the communication mode to the power-saving mode at a time when the power-saving command is received.

Thus, if a user holding the human body communication terminal 5 moves onto the mat-like human body communication antenna 4 placed on the front side of the image processing device 2, the human body communication terminal 5 detects a mat electric field at a certain level or higher generated from the human body communication antenna 4 to shift from the power-saving mode to the communication mode automatically. Then, the human body communication terminal 5 automatically transmits user information for user authentication to the image processing device 2 through the body of the user.

Figure 3:
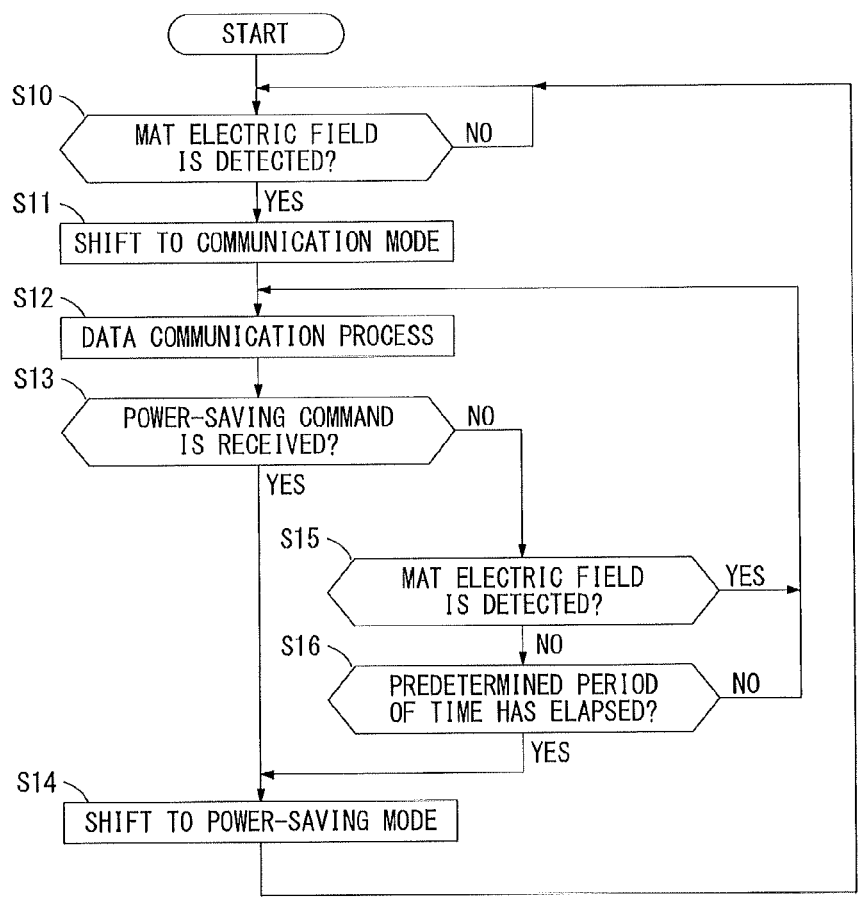
FIG. 3 is a flowchart explaining an example of procedure taken by a human body communication terminal.

The act of each of the human body communication terminal 5 and the image processing device 2 in the image processing system 1 of the aforementioned structure is described next. FIG. 3 is a flowchart explaining an example of procedure taken by the human body communication terminal 5. First, the human body communication terminal 5 is set in the power-saving mode. After starting the procedure, the human body communication terminal 5 is placed in a status of checking to see if a mat electric field is detected. The human body communication terminal 5 keeps the power-saving mode (NO of step S10) until it detects a mat electric field. If detecting a mat electric field (YES of step S10), the human body communication terminal 5 shifts from the power-saving mode to the communication mode (step S11), and starts data communication process with the image processing device 2 through the body of a user (step S12). After starting the data communication process, unless a particular command is received from the image processing device 2, the human body communication terminal 5 is placed in a status of repeatedly transmitting user information read from the storage 33.

Next, the human body communication terminal 5 in the communication mode determines if a power-saving command is received from the image processing device 2 (step S13). If the power-saving command is received (YES of step S13), the human body communication terminal 5 shifts from the communication mode to the power-saving mode at a time of the receipt to stop the data communication function of the communication controller 32 (step S14).

If the power-saving command is not received (NO of step S13), the human body communication terminal 5 determines if the electric field detecting unit 31 detects a mat electric field (step S15). If a mat electric field is detected (YES of step S15), the human body communication terminal 5 keeps the communication mode and returns to step S12. In contrast, if a mat electric field is not detected (NO of step S15), the human body communication terminal 5 determines if a predetermined period of time (few seconds, for example) has elapsed after detection of a mat electric field stops (step S16). If the predetermined period of time has not elapsed (NO of step S16), the human body communication terminal 5 returns to step S12 to execute a loop from step S12 to step S16 until the predetermined period of time has elapsed. If a mat electric field is detected again during the loop, a timer that counts elapse of the predetermined period of time is reset. If the predetermined period of time has elapsed before a mat electric field is detected (YES of step S16), the human body communication terminal 5 shifts from the communication mode to the power-saving mode at a time of the elapse to stop the data communication function of the communication controller 32 (step S14).

As described above, if the human body communication terminal 5 in the power-saving mode detects a mat electric field while a user stands on the human body communication antenna 4, it shifts from the power-saving mode to the communication mode. The human body communication terminal 5 in the communication mode shifts from the communication mode to the power-saving mode at a time of elapse of the predetermined period of time after the human body communication terminal 5 stops detecting a mat electric field or at a time of receipt of a power-saving command from the image processing device 2, thereby reducing power consumption of the battery 35. Thus, if a user moves away from the mat 3 placed on the front side of the image processing device 2, for example, the human body communication terminal 5 automatically shifts from the communication mode to the power-saving mode.

Figure 4:
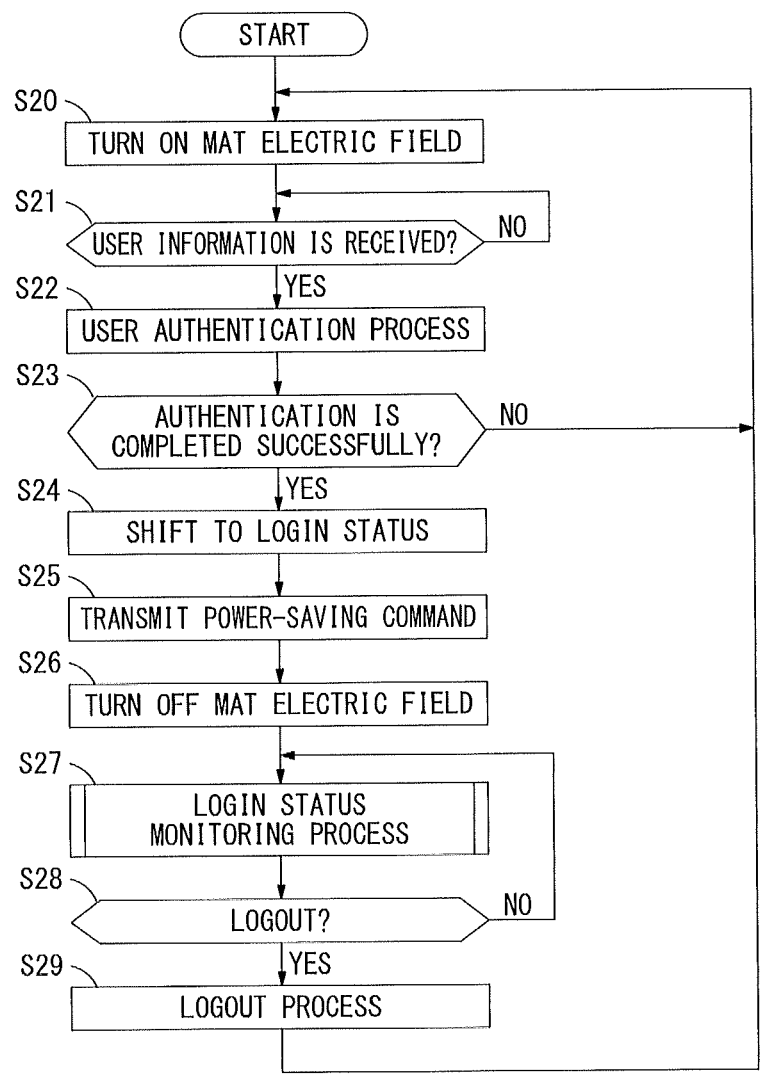
FIG. 4 is a flowchart explaining an example of procedure taken by an image processing device of the first preferred embodiment.
Figure 5:
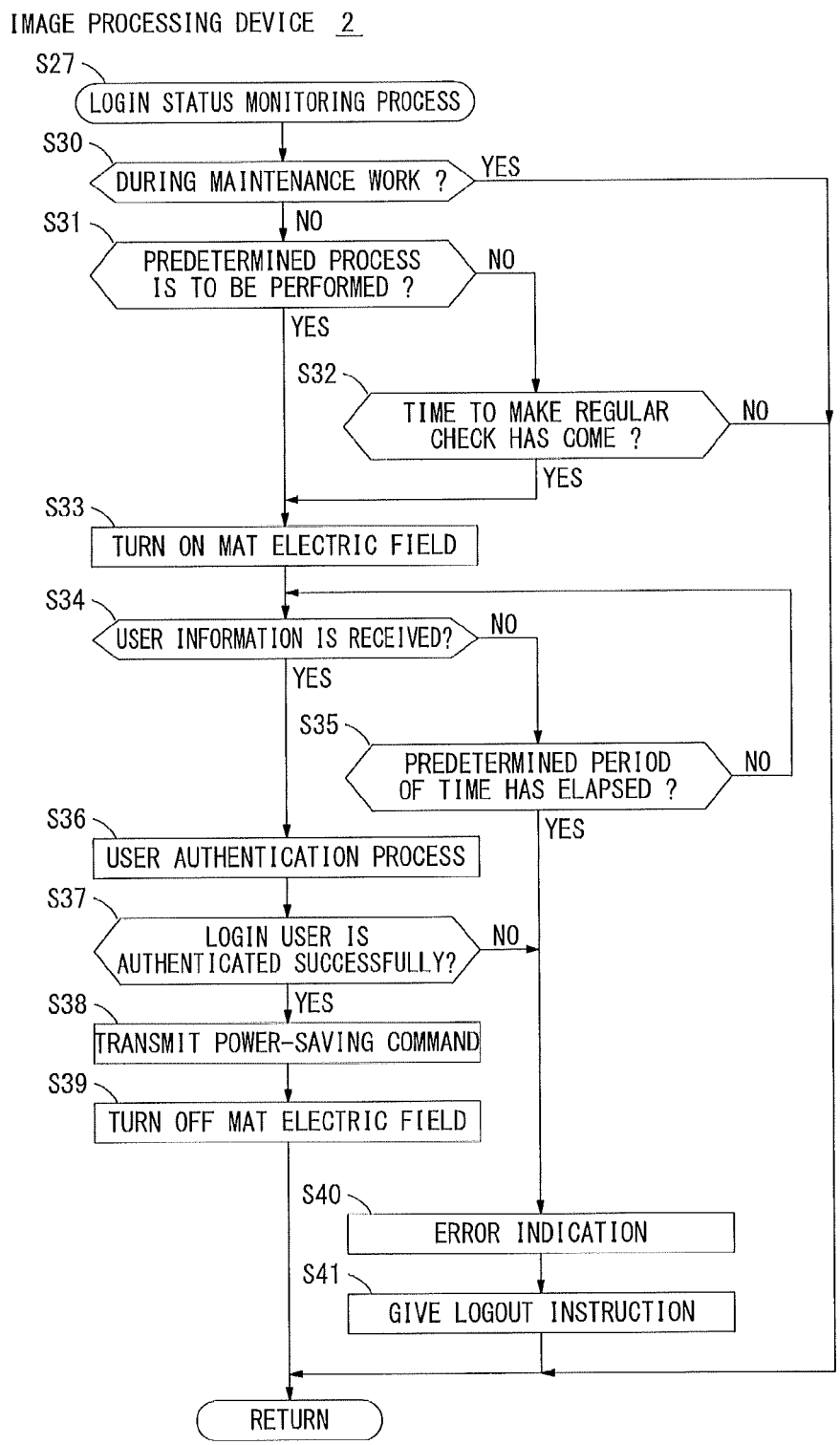
FIG. 5 is a flowchart explaining an example of detailed procedure of login status monitoring process.

Next, the act of the image processing device 2 of the aforementioned structure is described next. The image processing device 2 of the first preferred embodiment generates an electric field at a certain level steadily in the human body communication antenna 4 while it is in a logout status where a user does not log into the image processing device 2. In this condition, if the user moves to the mat 3 in a position on the front side of the image processing device 2, the human body communication terminal 5 detects a mat electric field to shift to the communication mode, and starts to transmit user information as described above. On receipt of the user information, the image processing device 2 performs user authentication. If the image processing device 2 completes the user authentication successfully to shift to a login status, the login user will stay on the human body communication antenna 4 for a relatively long period of time for starting various operations on the operational panel 12. Thus, in response to a result of the user authentication confirming that the user is a normal user, the image processing device 2 makes the human body communication terminal 5 shift from the communication mode to the power-saving mode. This allows reduction of the consumption of the battery 35 in the human body communication terminal 5, even if the login user is present on the front side of the image processing device 2 for a relatively long period of time, FIGS. 4 and 5 are flowcharts explaining an example of procedure taken by the image processing device 2. This procedure is started in response to power-on of the image processing device 2, for example. When the procedure is started in the image processing device 2, the human body communication controller 10 first generates a mat electric field in the human body communication antenna 4 in response to instruction from the CPU 11 (step S20). The image processing device 2 in this condition is placed in standby waiting for a user carrying the human body communication terminal 5 to move onto the mat 3 (step S21). When the user reaches the position of the mat 3, the human body communication controller 10 receives user information from the human body communication terminal 5 held by this user, and outputs the user information to the CPU 11 (YES of step S21). In response to receipt of the user information, the CPU 11 puts the user authenticating unit 21 into operation to perform user authentication process (step S22). The user authenticating unit 21 determines if the user authentication process is completed successfully (step S23). If the user authentication ends in failure (NO of step S23), the image processing device 2 does not proceed to subsequent process but returns to step S20. In contrast, if the authentication is completed successfully (YES of step S23), the user authenticating unit 21 puts the login controller 22 into operation to make the image processing device 2 shift from a logout status to a login status (step S24). Further, in response to the user authentication completed successfully, the user authenticating unit 21 instructs the human body communication controller 10 to stop making human body communication. In response, the human body communication controller 10 transmits a power-saving command to the human body communication terminal 5 (step S25). In response to completion of the transmission, the human body communication controller 10 turns off a mat electric field to be generated in the human body communication antenna 4 (step S26). As a result, the human body communication terminal 5 shifts to the power-saving mode. If the power-saving command can be received properly from the human body communication controller 10, the human body communication terminal 5 shifts to the power-saving mode based on this power-saving command. Meanwhile, even if the human body communication terminal 5 cannot receive the power-saving command properly, it shifts to the power-saving mode after elapse of a predetermined period of time in response to turn-off of a mat electric field. Even if the human body communication terminal 5 is of a type that cannot interpret a command from the image processing device 2, it also shifts to the power-saving mode after elapse of a predetermined period of time in response to turn-off of a mat electric field. Instead of turning off a mat electric field to be generated in the human body communication antenna 4, the human body communication controller 10 may reduce a mat electric field to a level below a certain level.

The image processing device 2 in a login status performs login status monitoring process repeatedly (step S27). The login status monitoring process is intended to check to see if the login user is not replaced by a different user or if the login user has not left the mat 3 on the front side of the image processing device 2 forgetting about performing logout operation. The login status monitoring process is performed at a time when certain process is performed in the image processing device 2, or performed on a regular basis.

FIG. 5 is a flowchart explaining an example of detailed procedure of the login status monitoring process (step S27). After starting this procedure, the image processing device 2 determines if maintenance work is being conducted (step S30). The maintenance work mentioned herein is work responsive to occurrence of paper jam or running out of toner during execution of a job, for example, and is conducted while a sheet-feeding cassette, a front cover or a side cover is opened. This maintenance work also includes work such as configuration setting or change of specifications of the image processing device 2, or addition of an optional function to the image processing device 2 that is conducted by an administrator or a serviceman of the image processing device 2 while the image processing device 2 is switched from a general usage mode to a maintenance mode. Thus, in step S30, it is determined if a sheet-feeding cassette, a front cover or a side cover is opened, or if the image processing device 2 is switched to the maintenance mode, for example. If it is determined that the maintenance work is being conducted (YES of step S30), the image processing device 2 completes the login status monitoring process without performing subsequent processes in steps S31 to S41. Hence, if the image processing device 2 is in the maintenance work, the processes in steps S31 to S41 are not performed before the maintenance work is completed.

If it is determined that the maintenance work is not being conducted (NO of step S30), the image processing device 2 determines if time has come to perform predetermined process based on instruction operation on the operational panel 12 (step S31). The predetermined process targeted for the determination is process that might cause a problem in terms of security if it is performed by instruction operation by a user different from the login user, for example. Hence, process involving security at a certain level or higher becomes a target for the determination. Examples of such process include process of making print output of data about a document stored in the storage 16, and process of transmitting data about a document stored in the storage 16 to the outside via network transmission or facsimile transmission. More specifically, the process targeted for the determination includes process of making print output of document data stored in a confidential box corresponding to the login user of the storage 16, for example. The process targeted for the determination further includes process of making print output of such print data received via a network that allows only the login user to make print output thereof. The process targeted for the determination also includes process of transmitting image data read by the image reading unit 14, image data stored in a box dedicated to the login user and the like to an external device via a network, and process of transmitting such image data as facsimile data to the outside. Additionally, the process targeted for the determination may also he process of deleting a job. If it is determined that time has come to perform the aforementioned predetermined process (YES of step S31), the image processing device 2 proceeds to step S33.

If it is determined that time has not come to perform the aforementioned predetermined (NO of step S31), the image processing device 2 determines if time has come to check the presence of the login user on a regular basis while the image processing device 2 in a login status (step S32). Specifically, the image processing device 2 in a login status is to check the presence of the login user regularly at predetermined intervals of from about several tens of seconds to about several minutes, and determines if time has come to check the presence. If the image processing device 2 determines in step S32 that the time has not come, it completes the login status monitoring process so that the human body communication terminal 5 keeps the power-saving mode. In contrast, if the image processing device 2 determines in step S32 that the time has come, it proceeds to step S33.

When the image processing device 2 proceeds to step S33, it generates a mat electric field at a certain level or higher again in the human body communication antenna 4 under control of the human body communication controller 10 in order to check the presence of the login user on the mat 3. If the login user is present on the mat 3, a mat electric field generated in the human body communication antenna 4 is transmitted through the body of the loin user and then detected by the human body communication terminal 5. Then, the human body communication terminal 5 shifts from the power-saving mode to the communication mode to transmit user information stored in the storage 33.

After turning on a mat electric field (step S33), the image processing device 2 determines if user information is received (step S34). If user information has not been received, the image processing device 2 is placed in standby waiting for user information to be received before elapse of a predetermined period of time (step S35). If the user information is received before elapse of the predetermined period of time (YES of step S34), the user authenticating unit 21 starts to operate again in the CPU 11 to perform user authentication process (step S36). During the user authentication, the user authenticating unit 21 determines if a user present on the mat 3 is the current login user. Then, the user authenticating unit 21 determines if the login user is authenticated successfully (step S37). If the login user is authenticated successfully (YES of step S37), the image processing device 2 allows the login user to continue process in the image processing device 2, and instructs the human body communication controller 10 to stop making human body communication. In response, the human body communication controller 10 transmits a power-saving command to the human body communication terminal 5 (step S38). In response to completion of the transmission, the human body communication controller 10 turns off a mat electric field again to be generated in the human body communication antenna 4 (step S39).

If the user information has not been received before elapse of the predetermined period of time after a mat electric field is turned on (YES of step S35) or if the login user is not authenticated successfully (NO of step S37), the image processing device 2 displays error indication on the display section 12a of the operational panel 12 (step S40), and gives logout instruction to the login controller 22 to make the current login user automatically log out of the image processing device 2 (step S41). At this time, if there is an unfinished job, the job controller 23 does not process this job further but keeps the job suspended.

Thus, in the login status monitoring process (step S27), if the login user cannot be authenticated at a time when certain process is performed in the image processing device 2 or at a time when the presence of the login user is checked on a regular basis, logout instruction is given. If the login user can be authenticated, process is continued in the image processing device 2. In this case, the login user is allowed to execute a desired job. Additionally, if the image processing device 2 is in the maintenance work, user authentication process to confirm the login user is not performed. Thus, the human body communication terminal 5 of a user conducting the maintenance work can keep the power-saving mode.

Referring back to the flowchart of FIG. 4, when the login status monitoring process (step S27) is completed, the image processing device 2 determines if logout process is to be performed (step S28). Here, the image processing device 2 determines if logout instruction has been given as a result of the login status monitoring process (step S27) or if the login user has performed logout operation manually. If the logout process is to be performed (YES of step S28), the login controller 22 performs the logout process to make the image processing device 2 shift from a login status with the login user to a logout status (step S29). Then, the image processing device 2 returns to step S20 to repeat the aforementioned procedure. If the logout process is not to be performed (NO of step S28), the image processing device 2 returns to step S27 to perform the login status monitoring process (step S27) repeatedly while it is in a login status.

FIGS. 6A, 6B, 7A and 7B are timing charts each showing transitions of respective acting statuses of the image processing device 2 and the human body communication terminal 5. FIG. 6A shows transitions of basic acting statuses. As shown in FIG. 6A, if a user carrying the human body communication terminal 5 moves onto the mat 3 at a time T1, for example, the human body communication terminal 5 shifts from the power-saving mode to the communication mode at the time T1 to transmit user information to the image processing device 2. The image processing device 2 performs user authentication based on this user information and shifts to a login status at a time T2 when the user is confirmed as a normal user. In response to shift of the image processing device 2 to a login status, the human body communication terminal 5 returns from the communication mode to the power-saving mode at the time T2, thereby reducing drain of the battery 35.

FIG. 6B shows transitions of the acting statuses that are made while predetermined process (such as execution of a print job) is performed based on instruction operation by a login user after the image processing device 2 shifts to a login status. The times T1 and T2 are corresponding to those of FIG. 6A. After the image processing device 2 shifts to a login status at the time T2, the human body communication terminal 5 is placed in the power-saving mode. If a login user performs operation to instruct execution of a job such as one to make print output of document data in a confidential box while the image processing device 2 keeps a login status, the image processing device 2 recognizes that time has come to perform user authentication. Then, the image processing device 2 turns on a mat electric field at a time T3. In response, the human body communication terminal 5 shifts from the power-saving mode to the communication mode to transmit user information to the image processing device 2. The image processing device 2 performs user authentication again based on this user information, and starts to execute the job at a time T4 when the presence of the login user is confirmed. Meanwhile, the human body communication terminal 5 returns from the communication mode to the power-saving mode again at the time T4 when the image processing device 2 completes user authentication successfully again, thereby reducing drain of the battery 35, FIG. 7A shows transitions of the acting statuses that are made while the presence of a login user is checked on a regular basis after the image processing device 2 shifts to a login status. The times T1 and T2 are corresponding to those of FIG. 6A. After the image processing device 2 shifts to a login status at the time T2, the human body communication terminal 5 is placed in the power-saving mode. If a fixed period of time Ts has elapsed while the image processing device 2 keeps a login status, the image processing device 2 recognizes that time has come to perform user authentication. Then, the image processing device 2 turns on a mat electric field at a time T5. In response, the human body communication terminal 5 shifts from the power-saving mode to the communication mode to transmit user information to the image processing device 2. The image processing device 2 performs user authentication again based on this user information. When the presence of a login user is confirmed at a time T6, the image processing device 2 keeps a login status. The human body communication terminal 5 returns from the communication mode to the power-saving mode again at the time T6 when the image processing device 2 completes user authentication successfully again, thereby reducing drain of the battery 35. After the time T6, each time the fixed period of time Ts has elapsed, the image processing device 2 performs user authentication to check the presence of a login user.

FIG. 7B shows transitions of the acting statuses that are made while maintenance work is conducted after the image processing device 2 shifts to a login status. The times T1 and T2 are corresponding to those of FIG. 6A. After the image processing device 2 shifts to a login status at the time T2, the maintenance work is started at a time T7. Then, the image processing device 2 determines that the maintenance work is being conducted. Even if the fixed period of time Ts has elapsed after the image processing device 2 shifts to a login status, the image processing device 2 does not perform user authentication at a time of the elapse while the image processing device 2 is in the maintenance work. Thus, the human body communication terminal 5 keeps the power-saving mode while the maintenance work is conducted in the image processing device 2. When the maintenance work is completed at a time T8, the image processing device 2 performs user authentication to check to see if a login user is present on the mat 3. At this time, the human body communication terminal 5 shifts from the power-saving mode to the communication mode to transmit user information to the image processing device 2. The image processing device 2 performs user authentication again based on this user information. If the presence of a login user is confirmed at a time T9, the image processing device 2 keeps a login status. If there is an unfinished job, the image processing device 2 starts to execute the job again. The human body communication terminal 5 returns from the communication mode to the power-saving mode again at the time T9 when the image processing device 2 completes user authentication successfully again, thereby reducing drain of the battery 35.

As described above, the image processing device 2 of the first preferred embodiment is configured to perform user authentication based on user information acquired from the human body communication terminal 5 held by a user by making human body communication with the human body communication terminal 5 through the human body communication antenna 4. The image processing device 2 is also configured to make the human body communication terminal 5 shift from the communication mode to the power-saving mode in response to the user authentication by which a user is authenticated. Even if a user authenticated by the image processing device 2 continues to use the image processing device 2 for a long time, the aforementioned configuration of the image processing device 2 achieves the shortest possible time when the human body communication terminal 5 is in the communication mode, thereby achieving long lifetime of the battery 35.

The image processing device 2 is also configured to perform user authentication again at a time when certain process is preformed in the image processing device 2 based on instruction operation by a login user, or perform user authentication again on a regular basis while the image processing device 2 is in a login status with the login user. Thus, the image processing device 2 can favorably detect a condition where the login user is replaced by a different user or a condition where the login user has left the image processing device 2 while the image processing device 2 is in a login status. This effectively prevents operation such as execution of a job by an illegal user not authenticated by the image processing device 2.

The image processing device 2 is also configured such that, when maintenance work is being conducted in the image processing device 2 in a login status, it does not perform user authentication again before this maintenance work is completed, and performs user authentication again at a time when the maintenance work is completed. This allows the human body communication terminal 5 to keep the power-saving mode to suppress drain of the battery 35 during the maintenance work, while allowing the image processing device 2 to precisely determine if the image processing device 2 can keep a login status when the maintenance work is completed.

Second Preferred Embodiment

Figure 8:
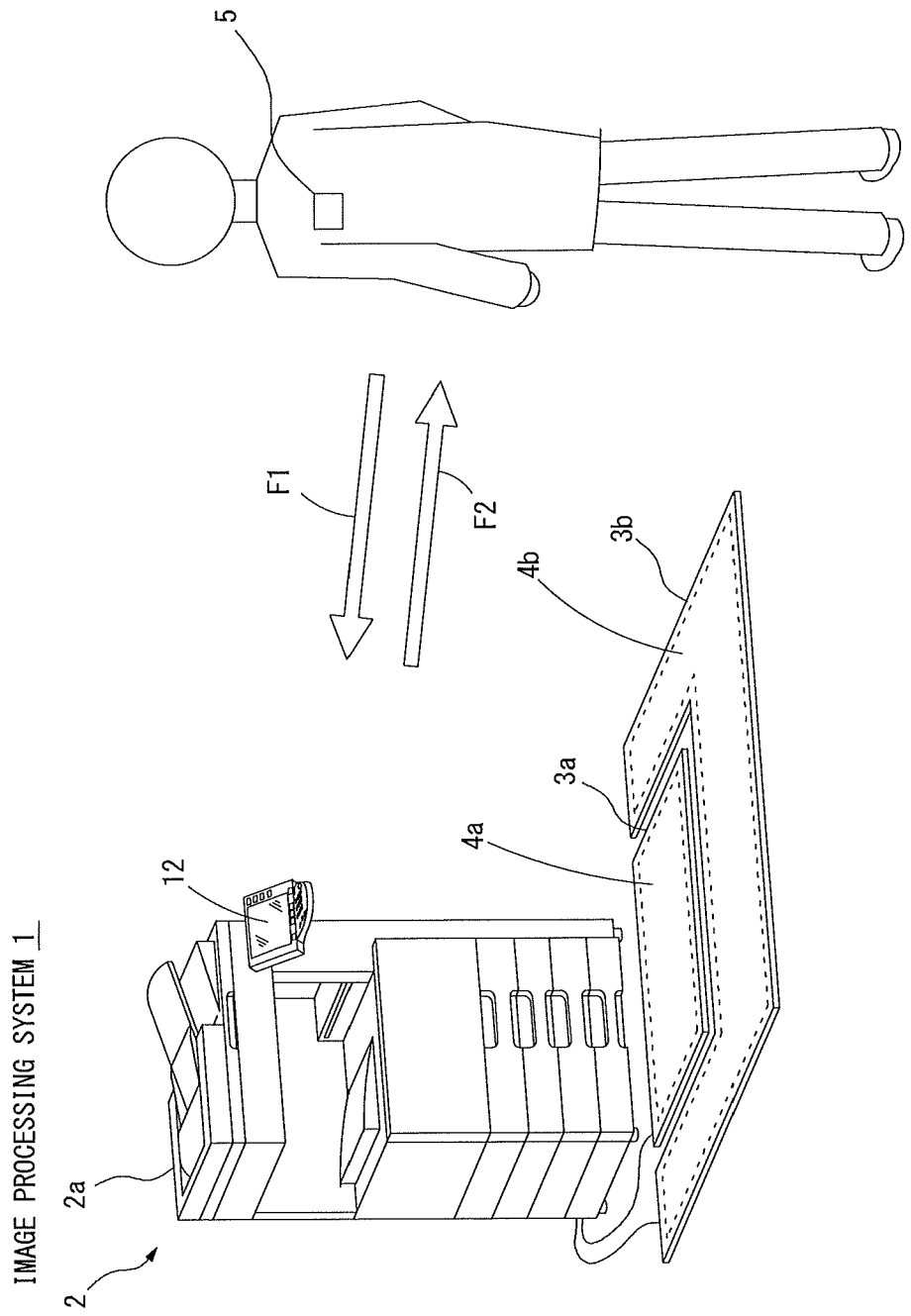
FIG. 8 shows an example of the structure in external appearance of an image processing system of a second preferred embodiment.

A second preferred embodiment of the present invention is described next. FIG. 8 shows an example of the structure in external appearance of an image processing system 1 of the second preferred embodiment of the present invention. In this image processing system 1, two mats 3a and 3b are placed around the device body 2a of the image processing device 2. The first mat 3a is placed near the image processing device 2 and on the front side thereof, and has a first built-in human body communication antenna 4a. The second mat 3b is placed on the front side of the image processing device 2 so as to surround the first mat 3a, and has a second built-in human body communication antenna 4b. The first and second human body communication antennas 4a and 4b are connected independently to the image processing device 2.

The image processing device 2 has the same functional structure as that of FIG. 2. Meanwhile, the human body communication controller 10 of the second preferred embodiment can control the first and second human body communication antennas 4a and 4b independently, and can distinguish between user information received from the first human body communication antenna 4a and user information received from the second human body communication antenna 4b. The human body communication terminal 5 carried by a user has the same functional structure as that of FIG. 2.

In the structure of FIG. 8, when a user carrying the human body communication terminal 5 moves toward the image processing device 2 on foot in the direction of an arrow F1 with the intention of using the image processing device 2, the user first steps on the second mat 3b and then moves onto the first mat 3a. Hence, when the user is to use the image processing device 2, the second human body communication antenna 4b first receives user information from the human body communication terminal 5, and then the first human body communication antenna 4a receives user information from the human body communication terminal 5. This allows user authentication to be started at a relatively early stage while the user is moving toward the image processing device 2 with the intention of using the image processing device 2. As a result, if a job corresponding to the user is accumulated, preparatory act for executing this job can be started before the user steps on the first mat 3a.

When the user finishes using the image processing device 2 and moves in the direction of an arrow F2 of FIG. 8, for example, the user moves from the first mat 3a onto the second mat 3b. Accordingly, when the user moves away from the image processing device 2, the second human body communication antenna 4b receives user information from the human body communication terminal 5. Thus, even if a login user has left a position on the front side of the image processing device 2 forgetting about performing logout operation, the image processing device 2 can detect the login user leaving the image processing device 2. As a result, the image processing device 2 can perform logout process automatically at a time when the login user has left the image processing device 2.

Figure 9:
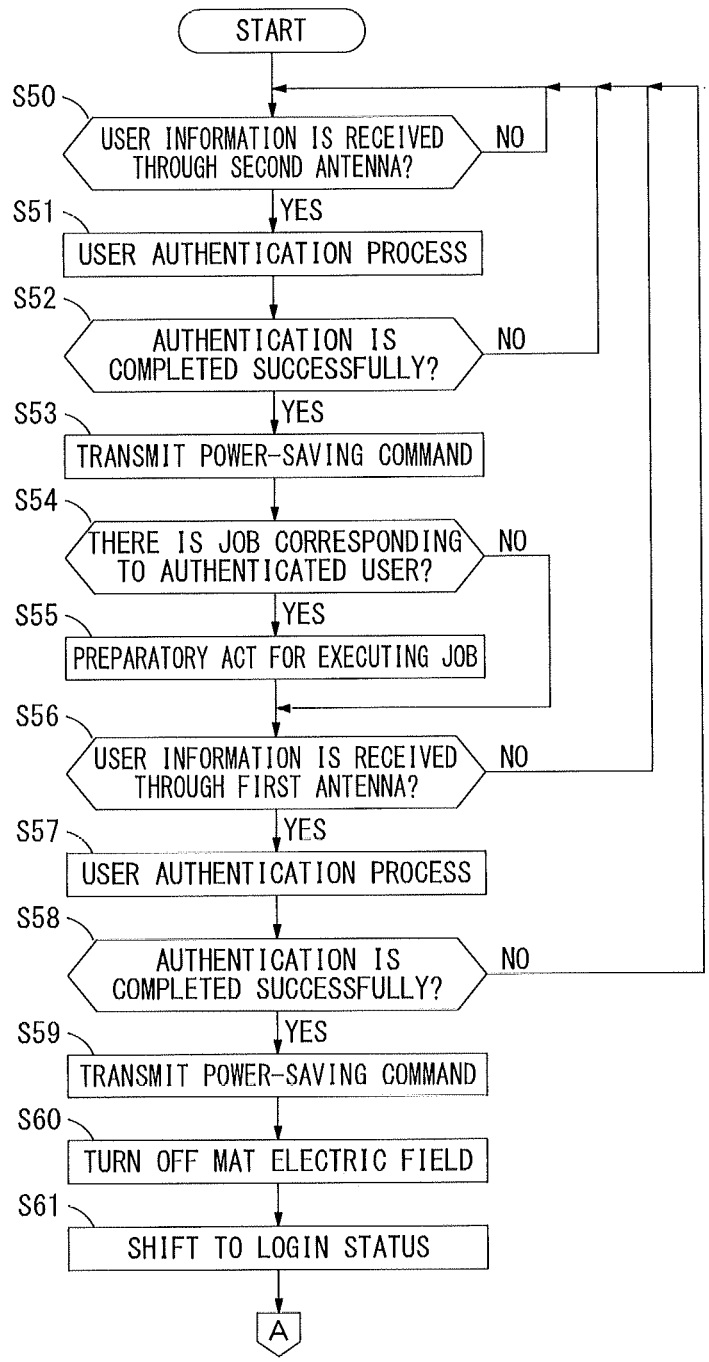
FIGS. 9 and 10 are flowcharts explaining an example of procedure taken by an image processing device of the second preferred embodiment.
Figure 10:
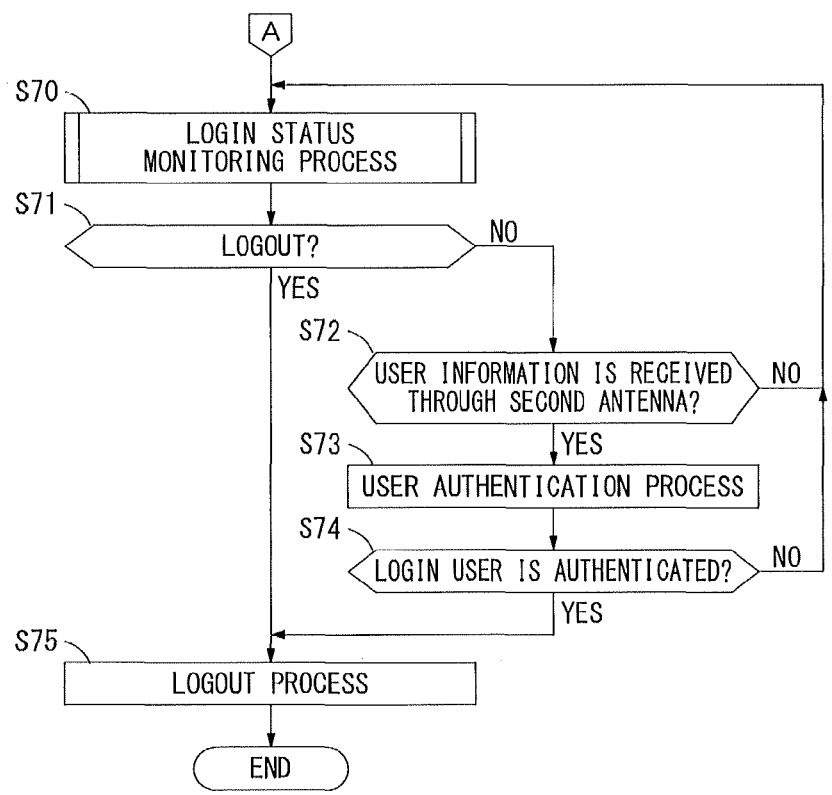

FIGS. 9 and 10 are flowcharts explaining an example of procedure taken by the image processing device 2 of the second preferred embodiment. This procedure is started in response to power-on of the image processing device 2 while a mat electric field is generated in each of the human body communication antennas 4a and 4b. When the procedure is started, the image processing device 2 is placed in standby waiting for a user carrying the human body communication terminal 5 to move onto the second mat 3b (step S50). When the user reaches the position of the mat 3b, the human body communication controller 10 receives user information from the human body communication terminal 5 held by this user, and outputs the user information to the CPU 11 (YES of step S50). Then, the CPU 11 puts the user authenticating unit 21 into operation to perform user authentication process (step S51) based on the user information the second human body communication antenna 4b received. The user authenticating unit 21 determines if a user is authenticated successfully in the user authentication (step S52). If the user authentication ends in failure (NO of step S52), the image processing device 2 does not proceed to subsequent process but returns to step S50. In contrast, if the user is authenticated successfully (YES of step S52), the human body communication controller 10 transmits a power-saving command to the human body communication terminal 5 through the second human body communication antenna 4b (step S53). This makes the human body communication terminal 5 terminal of the user shift to the power-saving mode.

Next, the login controller 22 determines if a job corresponding to the user authenticated by the user authenticating unit 21 is accumulated (step S54). Here, the login controller 22 determines if print data based on which the authenticated user can make print output is stored in the storage 16, for example. If determining that a job corresponding to the authenticated user is accumulated (YES of step S54), the login controller 22 instructs the job controller 23 to make preparatory act for executing the job. In response, the job controller 23 starts to make preparatory act for executing the job (step S55). In the case of a print job, for example, the print output unit 13 starts to warm up in this preparatory act. Execution of the job is not actually started in this preparatory act. Further, the login controller 22 does not make the image processing device 2 shift to a login status at a time when the preparatory act is started in the image processing device 2. If a job corresponding to the user authenticated by the user authenticating unit 21 is not accumulated, the image processing device 2 does not perform the process of step S55.

Next, the user authenticating unit 21 determines if user information is received again through the first human body communication antenna 4a (step S56) before elapse of a predetermined period of time (two or three seconds, for example) after the user authentication is completed successfully in step S52. If user information is not received before elapse of the predetermined period of time through the first human body communication antenna 4a (NO of step S56), the user authenticated in step S52 is a person who just passed through the front side of the image processing device 2. In this case, the image processing device 2 does not shift to a login status but returns to step S50. At the same time, the preparatory act for executing the job is completed and the image processing device 2 is placed in standby again waiting for a user to be detected on the second mat 3b.

If user information is received again through the first human body communication antenna 4a (YES of step S56) before elapse of the predetermined period of time after the user authentication is completed successfully in step S52, the user authenticating unit 21 performs user authentication process again (step S57) based on the user information the first human body communication antenna 4a received. The user authenticating unit 21 determines if the same user as the user authenticated in step S52 is authenticated successfully (step S58) in this user authentication. If the user authentication ends in failure (NO of step S58), the image processing device 2 does not proceed to subsequent process but returns to step S50. In contrast, if the same user is authenticated successfully (YES of step S58), the human body communication controller 10 transmits a power-saving command to the human body communication terminal 5 through the first human body communication antenna 4a (step S59). After transmitting the power-saving command, the human body communication controller 10 turns off a mat electric field to be generated in the first human body communication antenna 4a (step S60). This makes the human body communication terminal 5 of the user having reached a position on the front side of the image processing device 2 shift to the power-saving mode. A mat electric field in the second human body communication antenna 4b is not turned off so that the second human body communication antenna 4b keeps a condition where an electric field at a certain level is generated therein. In response to the determination made in step S58 that authentication is completed successfully, the login controller 22 determines that the user authenticated by the user authenticating unit 21 as a login user, and makes the image processing device 2 shift to a login status with this login user (step S61). As a result, an operational screen corresponding to the login user appears on the operational panel 12, thereby allowing the login user to perform instruction operation on the image processing device 2. The preparatory act for executing the job is already made in step S55. Thus, in response to the operation by the login user to instruct execution of the job, execution of the job is started without loss in the image processing device 2.

Referring to the flowchart of FIG. 10, when the image processing device 2 is placed in a login status with the login user, it performs login status monitoring process repeatedly (step S70) as in the first preferred embodiment. The particulars of the login status monitoring process (step S70) are the same as those described in the first preferred embodiment by referring to FIG. 5. When the login status monitoring process (step S70) is completed, the image processing device 2 determines if logout process is to be performed (step S71). Here, the image processing device 2 determines if logout instruction has been given as a result of the login status monitoring process (step S70) or if the login user has performed logout operation manually. If the logout process is to be performed (YES of step S71), the login controller 22 performs the logout process, and makes the image processing device 2 shift from a login status with the login user to a logout status (step S75).

In contrast, if the logout process is not to be performed (NO of step S71) after the login status monitoring process (step S70) is completed, the image processing device 2 determines if user information is received through the second human body communication antenna 4b (step S72). If user information has not been received through the second human body communication antenna 4b (NO of step S72), the image processing device 2 returns to step S70 to perform the login status monitoring process repeatedly. If user information is received through the second human body communication antenna 4b (YES of step S72), the user authenticating unit 21 performs user authentication process based on this user information (step S73) to determine if the login user is authenticated successfully (step S74).

Acquiring user information about the login user through the second human body communication antenna 4b means that the login user is about to leave a position on the front side of the image processing device 2 forgetting about performing logout operation. Hence, if the login user is authenticated as a result of the user authentication by the user authenticating unit 21 (YES of step S74), the login controller 22 performs logout process to make the image processing device 2 shift from a login status with the login user to a logout status (step S75). In contrast, if the user information acquired through the second human body communication antenna 4b is about a user different from the login user (NO of step S74), this user might be a person who is just passing through the front side of the image processing device 2. Hence, the image processing device 2 does not perform logout process automatically but returns to step S70 to perform the login status monitoring process repeatedly.

As described above, in the second preferred embodiment, the preparatory act for executing a job can be started at a relatively early stage when a user carrying the human body communication terminal 5 moves toward the image processing device 2 with the intention of executing the job. Thus, execution of the job can be started in the image processing device 2 immediately after the user logs into the image processing device 2, thereby advantageously enhancing processing efficiency. Additionally, in the second preferred embodiment, if a login user has left the image processing device 2 forgetting about performing logout operation, logout process can be performed automatically at a time when the login user has left the image processing device 2. Thus, the image processing device 2 will not be left uncontrolled in a login status. This further advantageously prevents illegal use of the image processing device 2 effectively by an outsider.

Third Preferred Embodiment

A third preferred embodiment of the present invention is described next. In the example shown in the second preferred embodiment, only one second mat 3b is arranged so as to surround the first mat 3a placed on the front side of the image processing device 2. Hence, in the second preferred embodiment, each time a user who is just moving to and fro around the image processing device 2 steps on the second mat 3b, preparatory act for executing a job is started in the image processing device 2. This might make it impossible to reduce power to be consumed by the image processing device 2. Hence, in an exemplary configuration of the third preferred embodiment, act of getting closer to the image processing device 2 by a user having the intention of using the image processing device 2 is detected more precisely, thereby preventing preparatory act for executing a job from becoming wasteful.

Figure 11:
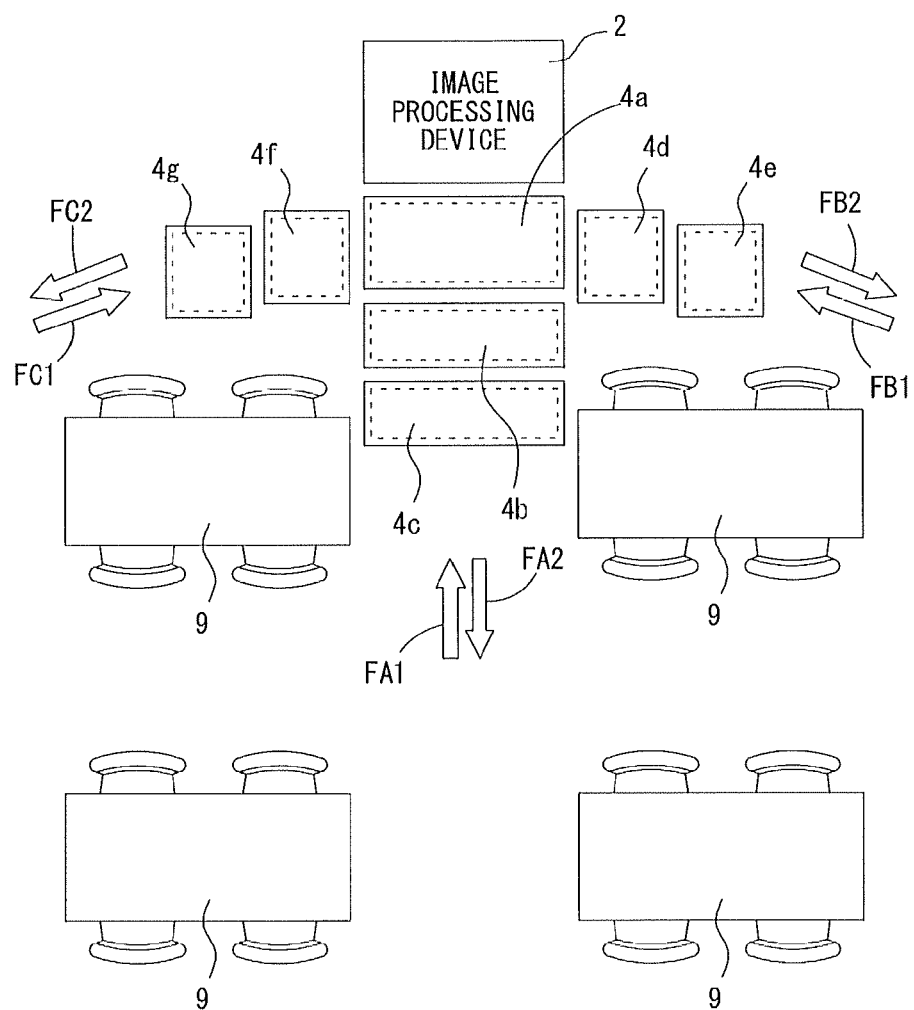
FIG. 11 is a plan view showing exemplary layout of an image processing device and a plurality of mat-like human body communication antennas of a third preferred embodiment.

FIG. 11 is a plan view showing exemplary layout of the image processing device 2 and a plurality of mat-like human body communication antennas 4a to 4g. The image processing device 2 is placed in a certain position in office space where a plurality of desks 9 is arranged. In this office space, transfer paths to be followed for using the image processing device 2 are defined according to the layout of the desks 9. In the third preferred embodiment, the mat-like human body communication antennas 4a to 4g are placed in these transfer paths. The mat-like human body communication antenna 4a placed on the front side of the image processing device 2 is one a login user is stepping on while the login user performs operation on the operational panel 12. The three mat-like human body communication antennas 4b, 4d and 4f placed outside the human body communication antenna 4a so as to surround the human body communication antenna 4a are those to detect passage of a user. The three mat-like human body communication antennas 4c, 4e and 4g placed outside the human body communication antennas 4b, 4d and 4f respectively are also those to detect a passage of a user.

Thus, if a user moves toward the image processing device 2 in the direction of an arrow FA1 of FIG. 11 for example with the intention of using the image processing device 2, the user first steps on the human body communication antenna 4c, then on the human body communication antenna 4b, and finally on the human body communication antenna 4a. If the user moves toward the image processing device 2 in the direction of an arrow FB1, the user first steps on the human body communication antenna 4e, then on the human body communication antenna 4d, and finally on the human body communication antenna 4a. If the user moves toward the image processing device 2 in the direction of an arrow FC1, the user first steps on the human body communication antenna 4g, then on the human body communication antenna 4f, and finally on the human body communication antenna 4a. If the same user information is acquired through each of the human body communication antennas 4a to 4g in these orders, the image processing device 2 can determine precisely that a user corresponding to this user information is moving toward the image processing device 2. In contrast, if user information is acquired first through one of the human body communication antennas 4c, 4e and 4g, and the same user information is not acquired thereafter through one of the human body communication antennas 4b, 4d and 4f before elapse of a predetermined period of time, the image processing device 2 can know that a user corresponding to the user information acquired through the human body communication antennas 4c, 4e or 4g has not moved toward the image processing device 2.

In the third preferred embodiment, if user information is acquired first through the human body communication antenna 4c, 4e or 4g, and the same user information is acquired thereafter through the subsequent human body communication antenna 4h, 4d or 4f before elapse of a predetermined period of time, preparatory act for executing a job is started in the image processing device 2. As in the first and second preferred embodiments, if a user is authenticated successfully based on user information acquired through each of the human body communication antennas 4a to 4g, the image processing device 2 transmits a power-saving command to the human body communication terminal 5. Thus, the third preferred embodiment can precisely detect act of moving toward the image processing device 2 by a user and then makes preparatory act for executing a job while reducing power consumed by the human body communication terminal 5. This prevents preparatory act for executing a job in the image processing device 2 from becoming wasteful, thereby advantageously reducing power also consumed by the image processing device 2.

If a login having finished using the image processing device 2 moves away from the image processing device 2 in the direction of an arrow FA2 of FIG. 11 for example, the login user moves from the human body communication antenna 4a onto the human body communication antenna 4b, and then steps on the human body communication antenna 4c. If the login moves away from the image processing device 2 in the direction of an arrow FB2, the login user moves from the human body communication antenna 4a onto the human body communication antenna 4d, and then steps on the human body communication antenna 4e. If the login moves away from the image processing device 2 in the direction of an arrow FC2, the login user moves from the human body communication antenna 4a onto the human body communication antenna 4f, and then steps on the human body communication antenna 4g. If user information about the login user is acquired through each of the human body communication antennas 4a to 4g in these orders, the image processing device 2 can determine precisely that the login user is moving away from the image processing device 2.

In the third preferred embodiment, if user information is acquired first through the human body communication antenna 4b, 4d or 4f and the same user information is acquired thereafter through the subsequent human body communication antenna 4c, 4e or 4g before elapse of a predetermined period of time while the image processing device 2 is in a login status, the image processing device 2 performs logout process automatically. At this time, the image processing device 2 also transmits a power-saving command to the human body communication terminal 5 if a user is authenticated successfully based on user information acquired through each of the human body communication antennas 4a to 4g, as in the first and second preferred embodiments. As a result, the third preferred embodiment can precisely detect act of moving away from the image processing device 2 by a login user and then performs logout process automatically.

Modifications

The present invention is not limited to the preferred embodiments described above but is applicable to various modifications.

In the examples of the aforementioned preferred embodiments, the image processing device 2 is composed of an MFP. However, the image processing device 2 is not limited to an MFP but it may also be a machine dedicated to printing, facsimile transmission, copying or scanning, for example.

In the aforementioned second preferred embodiment, warm-up of the print output unit 13 is shown as an example of preparatory act for executing a job. However, the preparatory act for executing a job is not limited to warm-up of the print output unit 13 but it may also be download of data corresponding to a user authenticated by the user authenticating unit 21, for example.

In the aforementioned preferred embodiments, the human body communication terminal 5 transmits only user information to the image processing device 2, to which the present invention is not intended to be limited. If data targeted for execution of a job such as image data is stored in the storage 33 of the human body communication terminal 5, for example, the human body communication terminal 5 may return from the power-saving mode to the communication mode under control of the image processing device 2. Then, in response to a request from the image processing device 2, the human body communication terminal 5 may transmit such data via human body communication to the image processing device 2.

What is claimed is:

1. An image processing device that executes a job based on instruction operation by a user authenticated as a result of user authentication, comprising
   a human body communication controller that makes human body communication with a human body communication terminal held by a user through at least one human body communication antenna arranged around a device body, and
   an authenticating unit that performs user authentication based on user information said human body communication controller acquires from said human body communication terminal,
   wherein said human body communication controller makes said human body communication terminal shift from a communication mode to a power-saving mode in response to authenticating a user by said authenticating unit.

2. The image processing device according to claim 1, wherein
   said human body communication antenna applies an electric field at a certain level to the body of a user to make said human body communication terminal held by this user shift from the power-saving mode to the communication mode, thereby making human body communication with said human body communication terminal, and
   said human body communication controller turns off or reduces an electric field to be generated in said human body communication antenna in response to authenticating a user by said authenticating unit, thereby making said human body communication terminal shift from the communication mode to the power-saving mode.

3. The image processing device according to claim 1, wherein
   said human body communication antenna applies an electric field at a certain level to the body of a user to make said human body communication terminal held by this user shift from the power-saving mode to the communication mode, thereby making human body communication with said human body communication terminal, and
   said human body communication controller transmits a power-saving command to said human body communication terminal through said human body communication antenna in response to authenticating a user by said authenticating unit, thereby making said human body communication terminal shift from the communication mode to the power-saving mode.

4. The image processing device according to claim 3, wherein
   after transmitting said power-saving command, said human body communication controller turns off or reduces an electric field to be generated in said human body communication antenna.

5. The image processing device according to claim 1, further comprising a login controller that determines a user authenticated by said authenticating unit as a login user and makes the image processing device shift to a login status with this login user, wherein
   said authenticating unit is configured to perform user authentication again at a time when certain process is performed based on instruction operation by said login user, or perform user authentication again on a regular basis while the image processing device is in a login status with said login user, and
   for user authentication to be performed again by said authenticating unit, said human body communication controller makes said human body communication terminal shift from the power-saving mode to the communication mode to acquire user information again from said human body communication terminal.

6. The image processing device according to claim 5, wherein
   if authentication of said login user ends in failure that is performed again by said authenticating unit while the image processing device is in a login status with said login user, said login controller makes the image processing device shift from a login status to a logout status.

7. The image processing device according to claim 5, further comprising a storage that stores data targeted for execution of a job, wherein
   said authenticating unit performs user authentication again at a time when print output of data stored in said storage is made based on instruction operation by said login user.

8. The image processing device according to claim 5, further comprising a storage that stores data targeted for execution of a job, wherein
   said authenticating unit performs user authentication again at a time when process of transmitting data stored in said storage to the outside is performed based on instruction operation by said login user.

9. The image processing device according to claim 5, wherein when the image processing device is in maintenance work while in a login status with said login user, said authenticating unit does not perform user authentication again before this maintenance work is completed, and performs user authentication again at a time when the maintenance work is completed.

10. The image processing device according to claim 1, wherein said human body communication controller makes human body communication with the human body communication terminal held by a user through a first human body communication antenna arranged near said device body and on the front side thereof and a second human body communication antenna arranged in a position farther from said device body than said first human body communication antenna, and each time said human body communication controller acquires user information from said human body communication terminal through each of said first and second human body communication antennas, said authenticating unit performs user authentication.

11. The image processing device according to claim 10, further comprising a login controller that determines a user authenticated by said authenticating unit as a login user and makes the image processing device shift to a login status with this login user, wherein while the image processing device is in a login status with said login user, if said login user is authenticated successfully as a result of user authentication performed by said authenticating unit based on user information said human body communication controller acquires from said human body communication terminal through said second human body communication antenna, said login controller makes the image processing device shift from a login status with said login user to a logout status.

12. The image processing device according to claim 10, further comprising a login controller that determines a user authenticated by said authenticating unit as a login user and makes the image processing device shift to a login status with this login user, wherein while the image processing device is in a logout status, if a user is authenticated as a result of user authentication performed by said authenticating unit based on user information said human body communication controller acquires from said human body communication terminal through said second human body communication antenna, said login controller starts preparatory act for executing a job registered in advance by this user.

13. An image processing system comprising:

an image processing device that executes a job based on instruction operation by a user authenticated as a result of user authentication;

a human body communication terminal which can be carried by a user and which stores user information about this user; and a human body communication antenna arranged around said image processing device, the human body communication antenna making data communication with said human body communication terminal held by a user through the body of this user, wherein said human body communication terminal is configured to detect an electric field applied to the body of a user by said human body communication antenna to shift from a power-saving mode to a communication mode, and then transmit said user information through the body of the user, and said image processing device acquires said user information transmitted from said human body communication terminal through said human body communication antenna and performs user authentication, and in response to authenticating a user as a result of the user authentication, said image processing device makes said human body communication terminal shift from the communication mode to the power-saving mode through the human body communication antenna.

14. The image processing system according to claim 13, wherein in response to authenticating a user as a result of said user authentication, said image processing device turns off or reduces an electric field to be generated in said human body communication antenna, thereby making said human body communication antenna shift from the communication mode to the power-saving mode.

15. The image processing system according to claim 13, wherein in response to authenticating a user as a result of said user authentication, said image processing device transmits a power-saving command to said human body communication terminal through said human body communication antenna, thereby making said human body communication terminal shift from the communication mode to the power-saving mode.

16. The image processing system according to claim 15, wherein after transmitting said power-saving command, said image processing device turns off or reduces an electric field to be generated in said human body communication antenna.

17. A user authentication method that performs user authentication by making human body communication with a human body communication terminal held by a user, the user authentication method comprising the steps of:

(a) making said human body communication terminal shift from a power-saving mode to a communication mode at a time when a user contacts at least one human body communication antenna and making human body communication with said human body communication terminal, thereby acquiring user information transmitted from said human body communication terminal;

(b) performing user authentication based on said user information; and (c) in response to authenticating a user as a result of said user authentication, making said human body communication terminal shift from the communication mode to the power-saving mode.

18. The user authentication method according to claim 17, wherein said step (a) includes a step of generating an electric field at a certain level in said human body communication antenna, and said step (c) includes a step of turning off or reducing an electric field to be generated in said human body communication antenna.

19. The user authentication method according to claim 17, wherein said step (c) includes a step of making said human body communication terminal shift from the communication mode to the power-saving mode by transmitting a power-saving command to said human body communication terminal through said human body communication antenna.

\* \* \* \* \*